US009762640B2

(12) United States Patent
VerSteeg et al.

(10) Patent No.: US 9,762,640 B2
(45) Date of Patent: *Sep. 12, 2017

(54) LOCATING POINTS OF INTEREST USING REFERENCES TO MEDIA FRAMES WITHIN A PACKET FLOW

(71) Applicant: Cisco Technology, Inc., San Jose, CA (US)

(72) Inventors: William C. VerSteeg, Alpharetta, GA (US); David Oran, Acton, MA (US); Robert Drisko, Concord, MA (US); Joshua Gahm, Newtonville, MA (US)

(73) Assignee: Cisco Technology, Inc., San Jose, CA (US)

( * ) Notice: Subject to any disclaimer, the term of this patent is extended or adjusted under 35 U.S.C. 154(b) by 128 days.

This patent is subject to a terminal disclaimer.

(21) Appl. No.: 14/624,604

(22) Filed: Feb. 18, 2015

(65) Prior Publication Data

US 2015/0163274 A1 Jun. 11, 2015

Related U.S. Application Data

(62) Division of application No. 11/933,483, filed on Nov. 1, 2007, now Pat. No. 8,966,551.

(51) Int. Cl.
*H04N 7/173* (2011.01)
*H04L 29/06* (2006.01)
*H04N 21/2343* (2011.01)
*H04N 21/2381* (2011.01)
*H04N 21/438* (2011.01)
*H04N 21/6437* (2011.01)
(Continued)

(52) U.S. Cl.
CPC ........ *H04L 65/604* (2013.01); *H04L 65/4069* (2013.01); *H04N 21/2381* (2013.01); *H04N 21/234381* (2013.01); *H04N 21/4384* (2013.01); *H04N 21/6437* (2013.01); *H04N 21/8455* (2013.01); *H04N 21/858* (2013.01)

(58) Field of Classification Search
None
See application file for complete search history.

(56) References Cited

U.S. PATENT DOCUMENTS 4,788,656 A 11/1988 Sternberger
4,907,277 A 3/1990 Callens
(Continued)

FOREIGN PATENT DOCUMENTS

WO 03/084134 10/2003
WO 2006/096021 A1 9/2006
(Continued)

OTHER PUBLICATIONS

Chinese Reexamination Decision dated Jan. 6, 2016 cited in Application No. 200880123531.2, 30 pgs.
(Continued)

*Primary Examiner* — Jason K Lin
(74) *Attorney, Agent, or Firm* — Merchant & Gould P.C.

(57) ABSTRACT

In one embodiment, a method comprises receiving a stream of transport packets encapsulating media packets, and generating a reference to the point-of-interest media packet relative to the location of the point-of-interest within the transport packet stream. The reference is generated for each media packet that is identified as a point-of-interest.

20 Claims, 13 Drawing Sheets

(51) Int. Cl.
*H04N 21/845* (2011.01)
*H04N 21/858* (2011.01)

(56) References Cited

U.S. PATENT DOCUMENTS

| | | | |
|---|---|---|---|
| 4,996,663 A | 2/1991 | Nemes | |
| 5,414,704 A | 5/1995 | Spinney | |
| 5,450,449 A | 9/1995 | Kroon | |
| 5,594,660 A | 1/1997 | Sung et al. | |
| 5,617,421 A | 4/1997 | Chin | |
| 5,699,478 A | 12/1997 | Nahumi | |
| 5,699,485 A | 12/1997 | Shoham | |
| 5,726,989 A | 3/1998 | Dokic | |
| 5,806,086 A | 9/1998 | Kimmel | |
| 5,842,040 A | 11/1998 | Hughes | |
| 5,859,660 A | 1/1999 | Perkins et al. | |
| 5,884,010 A | 3/1999 | Chen | |
| 5,898,837 A | 4/1999 | Guttman | |
| 5,917,830 A | 6/1999 | Chen et al. | |
| 5,943,347 A | 8/1999 | Shepard | |
| 5,946,302 A | 8/1999 | Waclawsky | |
| 5,956,721 A | 9/1999 | Douceur et al. | |
| 5,995,488 A | 11/1999 | Kalkunte | |
| 5,995,971 A | 11/1999 | Douceur et al. | |
| 6,038,000 A | 3/2000 | Hurst, Jr. | |
| 6,101,193 A | 8/2000 | Ohba | |
| 6,104,696 A | 8/2000 | Kadambi | |
| 6,173,317 B1 * | 1/2001 | Chaddha | G06F 17/30056 |
| | | | 348/E7.063 |
| 6,185,208 B1 | 2/2001 | Liao | |
| 6,275,861 B1 | 8/2001 | Chaudri | |
| 6,314,095 B1 | 11/2001 | Lao | |
| 6,341,130 B1 | 1/2002 | Lakshman | |
| 6,345,122 B1 | 2/2002 | Yamato et al. | |
| 6,356,545 B1 | 3/2002 | Vargo | |
| 6,389,006 B1 | 5/2002 | Bialik | |
| 6,421,802 B1 | 7/2002 | Schildbach | |
| 6,434,153 B1 | 8/2002 | Yazaki | |
| 6,438,695 B1 | 8/2002 | Maufer | |
| 6,507,562 B1 | 1/2003 | Kadansky | |
| 6,542,508 B1 | 4/2003 | Lin | |
| 6,590,894 B1 | 7/2003 | Kerr | |
| 6,611,502 B1 | 8/2003 | Seaman | |
| 6,629,141 B2 | 9/2003 | Elzur | |
| 6,658,000 B1 | 12/2003 | Raciborski | |
| 6,665,637 B2 | 12/2003 | Bruhn | |
| 6,671,722 B1 | 12/2003 | Stachura | |
| 6,687,360 B2 | 2/2004 | Kung | |
| 6,741,600 B1 | 5/2004 | Weiss | |
| 6,757,654 B1 | 6/2004 | Westerlund | |
| 6,760,309 B1 | 7/2004 | Rochberger | |
| 6,771,657 B1 * | 8/2004 | Elstermann | H04N 7/52 |
| | | | 370/465 |
| 6,801,496 B1 | 10/2004 | Saleh | |
| 6,801,525 B1 | 10/2004 | Bodnar | |
| 6,806,909 B1 | 10/2004 | Radha et al. | |
| 6,847,928 B1 | 1/2005 | Naka | |
| 6,854,117 B1 | 2/2005 | Roberts | |
| 6,868,069 B2 | 3/2005 | Knobbe | |
| 6,909,702 B2 | 6/2005 | Leung | |
| 6,909,743 B1 | 6/2005 | Ward et al. | |
| 6,928,482 B1 | 8/2005 | Ben-Nun | |
| 6,971,119 B1 | 11/2005 | Arsenault et al. | |
| 6,980,555 B2 * | 12/2005 | Mar | H04L 29/06 |
| | | | 370/389 |
| 6,993,081 B1 | 1/2006 | Brunheroto et al. | |
| 7,010,611 B1 | 3/2006 | Wiryaman | |
| 7,013,267 B1 | 3/2006 | Huart et al. | |
| 7,036,049 B2 | 4/2006 | Ali | |
| 7,055,174 B1 | 5/2006 | Cope | |
| 7,062,689 B2 | 6/2006 | Slobodnik | |
| 7,096,481 B1 | 8/2006 | Forecast et al. | |
| 7,096,488 B1 | 8/2006 | Zhang et al. | |
| 7,106,749 B1 | 9/2006 | Darshan et al. | |
| 7,139,242 B2 | 11/2006 | Bays | |
| 7,154,855 B2 | 12/2006 | Hardy | |
| 7,206,385 B2 | 4/2007 | Ethier | |
| 7,248,682 B1 | 7/2007 | Oran | |
| 7,269,157 B2 | 9/2007 | Klinker | |
| 7,286,467 B1 | 10/2007 | Sylvain | |
| 7,305,464 B2 | 12/2007 | Phillipi | |
| 7,324,499 B1 | 1/2008 | Borella | |
| 7,430,222 B2 | 9/2008 | Green et al. | |
| 7,432,950 B2 | 10/2008 | Deleam et al. | |
| 7,436,830 B2 | 10/2008 | Ben-Nun et al. | |
| 7,453,829 B2 | 11/2008 | Pasha et al. | |
| 7,454,494 B1 | 11/2008 | Hedayat | |
| 7,483,400 B2 | 1/2009 | Kuusinen et al. | |
| 7,496,044 B1 | 2/2009 | Wing | |
| 7,633,879 B2 | 12/2009 | Ramalho | |
| 7,720,432 B1 | 5/2010 | Colby et al. | |
| 7,817,546 B2 | 10/2010 | Filsfils et al. | |
| 7,835,406 B2 | 11/2010 | Oran et al. | |
| 7,848,478 B1 | 12/2010 | Huffman | |
| 7,911,946 B2 | 3/2011 | Poli et al. | |
| 7,936,695 B2 | 5/2011 | Oran | |
| 7,940,685 B1 | 5/2011 | Breslau et al. | |
| 7,962,942 B1 | 6/2011 | Craner | |
| 8,023,419 B2 | 9/2011 | Oran | |
| 8,352,590 B2 | 1/2013 | Sankaran et al. | |
| 8,867,385 B2 | 10/2014 | Oran | |
| 8,966,551 B2 | 2/2015 | VerSteeg et al. | |
| 9,197,857 B2 | 11/2015 | VerSteeg et al. | |
| 2001/0013123 A1 | 8/2001 | Freeman et al. | |
| 2001/0048662 A1 * | 12/2001 | Suzuki | H04L 12/5601 |
| | | | 370/230 |
| 2002/0016856 A1 | 2/2002 | Tallegas | |
| 2002/0064273 A1 | 5/2002 | Tomikawa | |
| 2002/0075895 A1 | 6/2002 | Yamaguchi | |
| 2002/0116501 A1 | 8/2002 | Ho | |
| 2002/0122418 A1 | 9/2002 | Bernstein | |
| 2002/0131425 A1 | 9/2002 | Shalom | |
| 2002/0141392 A1 | 10/2002 | Tezuka | |
| 2002/0150050 A1 | 10/2002 | Nathanson | |
| 2002/0154694 A1 | 10/2002 | Birch | |
| 2002/0194361 A1 | 12/2002 | Itoh | |
| 2002/0194589 A1 | 12/2002 | Cristofalo et al. | |
| 2002/0196850 A1 | 12/2002 | Liu et al. | |
| 2003/0014705 A1 | 1/2003 | Suzuki | |
| 2003/0023710 A1 | 1/2003 | Corlett | |
| 2003/0026241 A1 | 2/2003 | Ono | |
| 2003/0048786 A1 | 3/2003 | D'Annunzio | |
| 2003/0086425 A1 | 5/2003 | Bearden | |
| 2003/0117959 A1 | 6/2003 | Taranov | |
| 2003/0120789 A1 | 6/2003 | Hepworth et al. | |
| 2003/0123556 A1 | 7/2003 | Komori | |
| 2003/0145077 A1 | 7/2003 | Khan | |
| 2003/0145233 A1 | 7/2003 | Poletto et al. | |
| 2003/0198249 A1 | 10/2003 | Klein | |
| 2003/0204617 A1 | 10/2003 | Buchsbaum | |
| 2003/0227917 A1 | 12/2003 | Maher | |
| 2004/0037267 A1 | 2/2004 | Bennett | |
| 2004/0037320 A1 | 2/2004 | Dickson | |
| 2004/0042456 A1 | 3/2004 | Dittmann | |
| 2004/0071135 A1 | 4/2004 | Jimmei | |
| 2004/0073641 A1 | 4/2004 | Minhazuddin | |
| 2004/0095894 A1 | 5/2004 | Eloranta | |
| 2004/0141502 A1 | 7/2004 | Corson | |
| 2004/0179513 A1 | 9/2004 | Smith | |
| 2004/0181599 A1 | 9/2004 | Kreusch | |
| 2004/0185836 A1 | 9/2004 | Benitez Pelaez | |
| 2004/0203787 A1 | 10/2004 | Naghian | |
| 2004/0208186 A1 | 10/2004 | Eichen et al. | |
| 2004/0252694 A1 | 12/2004 | Adhikari | |
| 2004/0264433 A1 | 12/2004 | Melpignano | |
| 2005/0015816 A1 | 1/2005 | Cristofalo et al. | |
| 2005/0022253 A1 | 1/2005 | Chen et al. | |
| 2005/0055708 A1 * | 3/2005 | Gould | H04N 7/163 |
| | | | 725/25 |
| 2005/0102423 A1 | 5/2005 | Pelavin | |
| 2005/0138372 A1 | 6/2005 | Kajihara et al. | |
| 2005/0169174 A1 | 8/2005 | Apostolopoulos et al. | |
| 2005/0182850 A1 | 8/2005 | Kohno | |
| 2005/0220035 A1 | 10/2005 | Ling | |

(56) References Cited

U.S. PATENT DOCUMENTS

| | | |
|---|---|---|
| 2005/0229232 A1 | 10/2005 | Champel et al. |
| 2005/0232227 A1 | 10/2005 | Jorgenson |
| 2005/0243733 A1 | 11/2005 | Crawford |
| 2005/0246456 A1 | 11/2005 | Parry et al. |
| 2005/0268324 A1 | 12/2005 | An |
| 2005/0276276 A1 | 12/2005 | Davis |
| 2005/0281328 A1* | 12/2005 | Hurst .............. H04N 21/23424 375/240 |
| 2006/0002366 A1 | 1/2006 | Kawaguchi |
| 2006/0010243 A1 | 1/2006 | DuRee |
| 2006/0029065 A1 | 2/2006 | Fellman |
| 2006/0031445 A1 | 2/2006 | Rajan |
| 2006/0031510 A1 | 2/2006 | Beck |
| 2006/0059277 A1 | 3/2006 | Zito |
| 2006/0059411 A1 | 3/2006 | Dacosta |
| 2006/0075449 A1 | 4/2006 | Jagadeesan et al. |
| 2006/0106961 A1 | 5/2006 | Ebata |
| 2006/0107187 A1 | 5/2006 | Hannuksela |
| 2006/0114855 A1 | 6/2006 | Zheng |
| 2006/0126528 A1 | 6/2006 | Ramalho |
| 2006/0130118 A1 | 6/2006 | Damm |
| 2006/0143300 A1 | 6/2006 | See |
| 2006/0182034 A1 | 8/2006 | Klinker |
| 2006/0221837 A1 | 10/2006 | Gardner |
| 2006/0221930 A1 | 10/2006 | Sweeney |
| 2006/0280207 A1 | 12/2006 | Guarini et al. |
| 2007/0036087 A1 | 2/2007 | Kangru |
| 2007/0049307 A1 | 3/2007 | Mueckenheim |
| 2007/0061460 A1 | 3/2007 | Khan |
| 2007/0127391 A1 | 6/2007 | Goodman |
| 2007/0199052 A1 | 8/2007 | Sankaran |
| 2007/0230486 A1 | 10/2007 | Zafirov |
| 2008/0037425 A1 | 2/2008 | Pan et al. |
| 2008/0037864 A1 | 2/2008 | Zhang |
| 2008/0069002 A1 | 3/2008 | Savoor |
| 2008/0159279 A1 | 7/2008 | Younis |
| 2008/0170117 A1 | 7/2008 | Xiao |
| 2008/0189754 A1 | 8/2008 | Yoon et al. |
| 2008/0215704 A1 | 9/2008 | Curcio et al. |
| 2008/0220765 A1 | 9/2008 | Chu |
| 2008/0259924 A1 | 10/2008 | Gooch |
| 2008/0273698 A1* | 11/2008 | Manders ................ H04N 5/783 380/200 |
| 2008/0285452 A1 | 11/2008 | Oran |
| 2008/0285463 A1 | 11/2008 | Oran |
| 2008/0310316 A1 | 12/2008 | Oran |
| 2008/0317011 A1 | 12/2008 | Datta |
| 2009/0010158 A1 | 1/2009 | Filsfils |
| 2009/0013129 A1 | 1/2009 | Bondurant |
| 2009/0028142 A1 | 1/2009 | Schmidt et al. |
| 2009/0040941 A1* | 2/2009 | Yang ....................... H04L 12/66 370/253 |
| 2009/0119722 A1 | 5/2009 | VerSteeg et al. |
| 2009/0217318 A1 | 8/2009 | VerSteeg et al. |
| 2010/0039955 A1 | 2/2010 | Taylor et al. |
| 2011/0191469 A1 | 8/2011 | Oran |
| 2013/0198788 A1 | 8/2013 | Barger et al. |

FOREIGN PATENT DOCUMENTS

| | | |
|---|---|---|
| WO | 2007/047479 A2 | 4/2007 |
| WO | 2009/058645 A1 | 5/2009 |

OTHER PUBLICATIONS

Chinese Office Action dated Mar. 31, 2015 cited in Application No. 200880123531.2, 17 pgs.
International Preliminary Report dated May 4, 2010 cited in Appl. No. PCT/US2008/080882, 7 pgs.
Chinese First Office Action dated Sep. 27, 2012 cited in Application No. 200880123531.2, 27 pgs.
Chinese Second Office Action dated Jun. 5, 2013 cited in Application No. 200880123531.1, 27 pgs.
Chinese Rejection Decision dated Jan. 27, 2014 cited in Application No. 200880123531.2, 28 pgs.
European Office Action dated Nov. 10, 2014 cited in Application No. 08 845 733.8, 4 pgs.
U.S. Office Action dated Jun. 7, 2011 cited in U.S. Appl. No. 12/434,480, 16 pgs.
U.S. Final Office Action dated Feb. 28, 2012 cited in U.S. Appl. No. 12/434,480, 17 pgs.
U.S. Office Action dated Feb. 27, 2013 cited in U.S. Appl. No. 13/080,585, 30 pgs.
U.S. Final Office Action dated Sep. 26, 2013 cited in U.S. Appl. No. 13/080,585, 27 pgs.
U.S. Office Action dated Feb. 5, 2014 cited in U.S. Appl. No. 13/080,585, 25 pgs.
U.S. Office Action dated Jun. 6, 2014 cited in U.S. Appl. No. 12/434,480, 32 pgs.
U.S. Final Office Action dated Dec. 3, 2014 cited in U.S. Appl. No. 12/434,480, 22 pgs.
D. Singer & H. Desineni, "A General Mechanism for RPT Header Extensions," draft-ietf-avt-rtp-hdrext-12tx, Feb. 26, 2007.
J. Brassil et al., "Structuring Internet Media Streams With Cueing Protocols," IEEE/ACM Transactions on Networking, New York, NY, vol. 10, No. 4, Aug. 1, 2002, pp. 466-476.
"MPEG-7 Overview," (latest version: Version 10), Oct. 2004, International Organisation for Standardisation Organisation Internationale de Normalisation ISO/IEC JTC1/SC291WG11 Coding of Moving Pictures and Audio, N6828, 93 pgs.
P. Marques et al., "Monitoring Emerging IPV6 Wireless Access Networks," IEEE Wireless Communications, vol. 12, No. 1, Feb. 2005, pp. 47-53.
Marek Burza et al. Adaptive Streaming of MPEG-based Audio/Video Content over Wireless Networks, Apr. 2007, pp. 17-27, vol. 2, No. 2, Journal of Multimedia.
T.V. Lakshman et al., "High-Speed Policy-Based Packet Forwarding Using Efficient Multi-Dimensional Range Matching," 1998, ACM SIGCOMM Computer Communication Review, vol. 28, No. 4, 12 pgs.
Pendleton et al., "Session Initiation Package for Voice Quality Reporting Event," Sipping Working Group, 2006, pp. 1-24.
J. Postel, "User Datagram Protocol," retrieved from http://www.faqs.org/rfcs/rfc768.html on Jun. 13, 2009, originally published Aug. 28, 2980, pp. 1-3.
Information Sciences Institute, University of Southern California; Internet Protocol, DARPA Internet Program Protocol Specification, Sep. 1981, pp. 1-46.
Information Sciences Institute, University of Southern California; Transmission Control Protocol, DARPA Internet Program Protocol Specification, Sep. 1981, pp. 1-84.
R. Braden, "Network Working Group," Requirements for Internet Hosts—Communication Layers, Oct. 1989, p. 1-90.
Degermark et al., "IP Header Compression," Feb. 1999, RFC 2507, 42 pgs.
K. Hamzeh et al., "Point-to-Point Tunneling Protocol (PPTP)", RFC 2637, Jul. 1999, 57 pgs.
Liao et al., "Adaptive recovery techniques for real-time audio streams," IEEE INFOCOM 2001, Twentieth Annual Joint Conference of the IEEE Computer and Communications Societies, Proceedings, Apr. 22-26, 2001, vol. 2, 9 pgs.
Rosenburg, "An Offer/Answer Model with Session Description Protocol (SDP)," Jun. 2002, RFC 3264, 26 pgs.
T. Friedman et al., "RTP Control Protocol Extended Reports (RTCP XR)", RFC 3611, Nov. 2003, pp. 1-56.
Kevin Song X., "The ABC's of Network Security," The Certified Security Professional, Certification Magazine, Feb. 2004, 3 pgs.
B. Thompson et al., Tunneling Multiplexed Compressed RPT (TCRTP), Nov. 2005, RFC 4170, 22 pgs.
Jonsson et al., Robust Header Compression (ROHC): A Link-Layer Assisted Profile for IP/UDP/RTP, Jan. 2006, RFC 4362, 21 pgs.
Welch et al., "A Proposed Media Delivery Index (MDI)," Apr. 2006, RFC 4445, 9 pgs.
Schulzrinne et al., "RTP: A Transport Protocol for Real-Time Applications," Network Working Group, RFC 3550, 2003, pp. 1-92.

(56) References Cited

OTHER PUBLICATIONS

Chinese Notification of Reexamination dated Aug. 26, 2015 cited in Application No. 200880123531.2, 17 pgs.

\* cited by examiner

LOCATING POINTS OF INTEREST USING REFERENCES TO MEDIA FRAMES WITHIN A PACKET FLOW

RELATED APPLICATIONS

This application is a Division of co-pending U.S. application Ser. No. 11/933,483 entitled "Locating Points of Interest Using References to Media Frames Within a Packet Flow" filed Nov. 1, 2007, which is incorporated herein by reference.

TECHNICAL FIELD

The present disclosure relates generally to digital multimedia streams.

BACKGROUND

Many consumers receive entertainment programming carried via digital signals. Programming (e.g., television programs, movies, sports events, music, etc.) is encoded at a head-end using a compression standard such as Motion Pictures Experts Group (MPEG) or H.264. The resulting stream of frames is transmitted to a media receiver, which may decode and display the stream, store the stream for later viewing, and/or further process the encoded stream.

The digitally encoded stream is carried over a core network (such as the Internet) downstream to the edge of the network, where the core network interfaces with a subscriber access network. The digitally encoded stream may be transformed or consumed by one or more intermediate processing functions located at the edge. Examples of such intermediate processing functions include network-based digital video recording, video on demand, fast channel change, video error repair, encryption/key generation, and digital program insertion. Some of these intermediate processing functions operate by locating key frames or other "points of interest" within the encoded stream. Conventional solutions place the functionality of locating points of interest within the intermediate processing function. However, locating points of interest is relatively compute-intensive, since this involves examining the structural information in each encoded elementary stream and in the multiplexed transport stream when transport streams are used. When such conventional solutions also encrypt the transport stream and/or the elementary stream, then locating points of interest also requires first decrypting the transport stream packets. Thus, a more flexible technique for locating points of interest, and for communicating this information to intermediate processing functions, is desired.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

DESCRIPTION OF EXAMPLE EMBODIMENTS

Overview

In one embodiment, a method comprises receiving a stream of transport packets encapsulating media packets, and generating a reference to the point-of-interest media packet relative to the location of the point-of-interest within the transport packet stream. The reference is generated for each media packet that is identified as a point-of-interest.

In another embodiment, a system comprises memory with logic, and a processor. The processor is configured with the logic to receive a stream of transport packets encapsulating media packets, and to identify one or more of the media packets as a point-of-interest. The processor is further configured with the logic to generate a reference to the point-of-interest (POI) media packet relative to the location of the POI within the transport packet stream. The reference is generated for each media packet identified as a point-of-interest.

In another embodiment, a system comprises means for receiving a stream of transport packets encapsulating media packets, and identifying one or more of the media packets as a point-of-interest. The system further comprises means for generating a reference to the point-of-interest (POI) media packet relative to the location of the POI within the transport packet stream. The reference is generated for each media packet identified as a point-of-interest.

Example Embodiments

Figure 1:
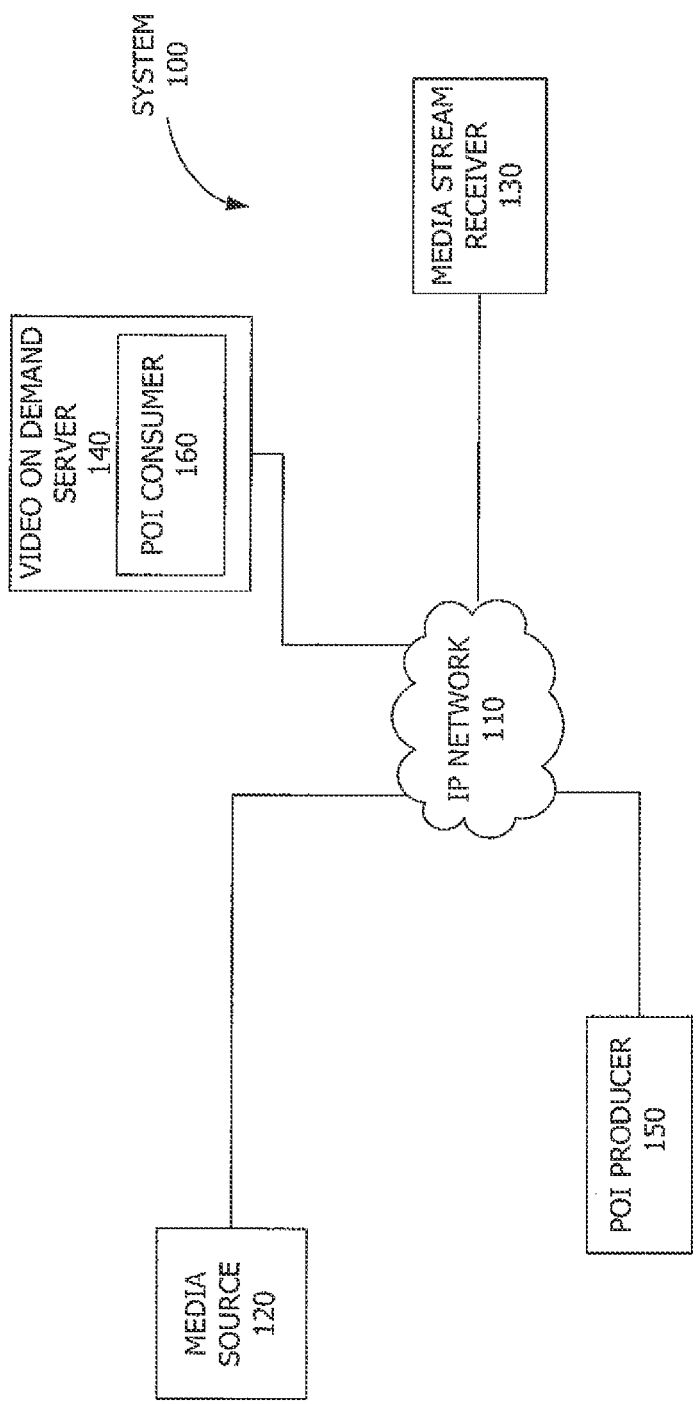
FIG. 1 is a block diagram of an environment in which one embodiment of a system and method for utilizing locating points of interest is located.

FIG. 1 is a block diagram of an environment in which one embodiment of a system and method for utilizing locating points of interest using references to media frames within a packet flow is located. A system 100 delivers digital multimedia, video and/or television services to subscribers over an Internet Protocol (IP) network 110.

Media source 120 encodes, formats, and transmits a digital media stream. The encoded media stream is then communicated to a media stream receiver 130, which stores, decodes, and/or renders the media stream. Media stream receiver 130 may take the form of (for example) a digital set-top box, a digital video recorder, a home media server, a personal computer, a personal digital assistant, a mobile phone, etc. In this disclosure, the term "media stream" refers to a stream that includes video frames, audio frames, multimedia, or any combination thereof. Common encoding formats for digital media streams include MPEG-2, MPEG-4, H.264, and VC-1. In some environments, the encoded media stream represents a single program, and thus contains a video and an audio stream multiplexed together into a single program transport stream (SPTS).

System 100 also contains one or more components that are downstream of media source 120, and which perform intermediate processing of the encoded media stream. FIG. 1 contains one example of such a component, a video-on-demand (VOD) server 140. VOD server 140 ingests a media stream from media source 120 and plays the stream out at a later time in response to a user request ("on demand"). VOD server 140 also processes the ingested stream to provide "trick mode" capabilities, such as fast-forward, rewind, slow-motion, and pause. Another example of an intermediate processing component is a fast channel change server (not shown), which ingests a media stream from media source 120, and stores, into a cache, a moving "window" through the stream. This cache represents the last few seconds of the stream contents. On request, the fast channel change server plays out a portion ("burst") of the cached window, in order to accelerate the channel change. Without such processing by a fast channel change server, a user typically experiences a delay in displaying the new stream that results from a channel change, during which time the screen might be frozen or blank.

These and other intermediate processing units operate by locating key frames or points of interest (POI) within the encoded stream. Key frames are video frames which can be decoded without reference to another frame. VOD server 140 provides some trick-mode functions by creating a trick mode stream which contains only key frames, or references to such frames. A fast channel change server uses key frames to resynchronize a decoder after a channel change. In addition to key frames, other points of interest in the encoded stream include program-specific information (PSI). Examples of PSI are program map tables (PMTs), program allocation tables (PATs), and entitlement control messages (ECM). PATs and PMTs both provide fundamental structural information about a stream, which a decoder uses to find and process the elements of that stream. ECMs contain keying information that is used to decrypt encrypted content appearing later in the stream. Having these elements explicitly identified as points of interest allows intermediate processing functions to determine which pieces to cache, without having to parse the stream. In addition to the two examples of intermediate processing discussed here (fast channel change and video-on-demand), a person of ordinary skill in the art will be aware of other intermediate processing functions which utilize points of interest, and the principles disclosed herein apply to these as well.

Using inventive features disclosed herein, point-of-interest producer 150 generates references to these points of interest within the media stream, and provides these references to an intermediate component (e.g., a consumer of the points of interest) such as VOD server 140. Point-of-interest consumer 160 uses the references to locate the points of interest within the media stream. An intermediate component associated with point-of-interest consumer 160 uses the points of interest to perform its intermediate function (e.g., produce a trick mode stream). In the example of FIG. 1, this intermediate component is VOD server 140, and point-of-interest consumer 160 resides within VOD server 140. However, a person of ordinary skill in the art should appreciate that, in other embodiments, point-of-interest consumer 160 is separate from, but in communication with, an intermediate function such as VOD server 140.

Figure 2A:
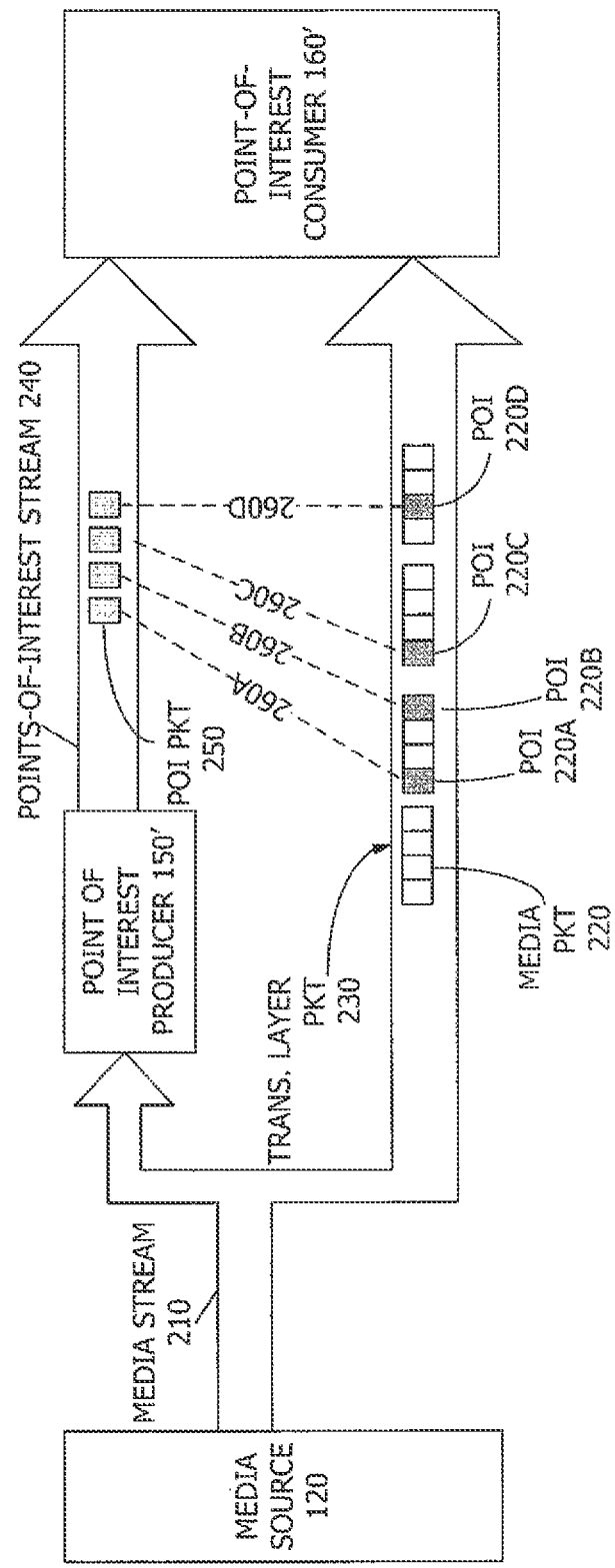
FIG. 2A is a block diagram of an embodiment in which a media stream is received by a point-of-interest producer and by a point-of-interest consumer.

Point-of-interest producer 150 can use different mechanisms to provide point-of-interest references to point-of-interest consumer 160. FIG. 2A is a block diagram of an embodiment in which media stream 210 is received by a point-of-interest producer 150' and by a point-of-interest consumer 160'. Media stream 210 is a stream 220 of media packets that are either elementary stream packets, or elementary streams encapsulated within transport layer packets 230. The inventive concepts described herein apply to various types of elementary stream encapsulations, including (but not limited to): raw MPEG2 Transport Stream (TS) over legacy transport; MPEG2 Elementary Stream (ES) over UDP/IP, RTP/UDP/IP and RTP/TCP/IP; MPEG2 TS over UDP/IP, RTP/UDP/IP and RTP/TCP/IP.

Point-of-interest producer 150' examines media stream 210 to identify one or more media packets 220 that contain points-of-interest. In the example embodiment of FIG. 2A, POI producer 150' generates a corresponding, but separate, points-of-interest stream 240 that contains references to these "interesting" media packets 220 within media stream 210. Points-of-interest stream 240 is a stream of POI packets 250, where a POI packet 250 contains one or more references to media packets 220, within media stream 210, that were identified as points of interest. In FIG. 2A, these references are represented symbolically by lines 260. More details about mechanisms for implementing references to media packets 220 will be discussed later in connection with FIG. 3.

Point-of-interest consumer 160' receives points-of-interest stream 240, and also receives the original media stream 210. Point-of-interest consumer 160' uses points-of-interest stream 240 to locate individual points-of-interest (e.g., key frames, program-specific information) within media stream 210. In the example scenario of FIG. 2A, four media packets (220A-D) are identified as points-of-interest, and thus points-of-interest stream 240 contains four POI references (260A-D). Once the points-of-interest are located, an intermediate processing function (not shown) uses the points-of-interest in a manner appropriate to its function.

Figure 2B:
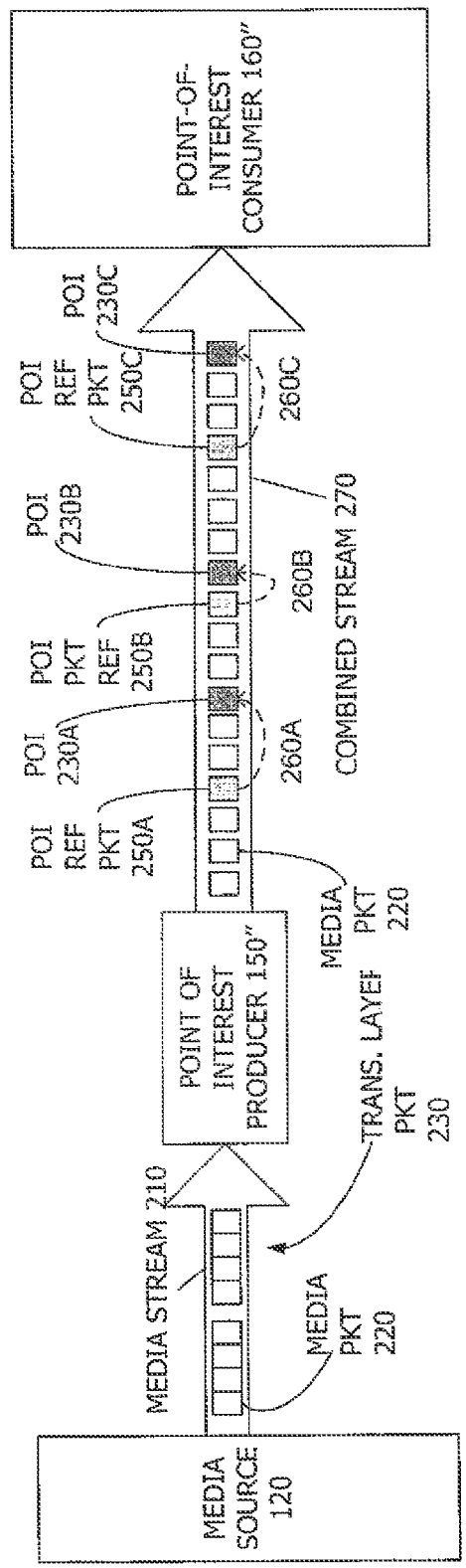
FIG. 2B is a block diagram of another embodiment in which a point-of-interest producer parses a media stream to locate points-of-interest, and produces a combined stream.

FIG. 2B is a block diagram of an alternative embodiment in which point-of-interest producer 150" parses media stream 210 to locate points-of-interest, and produces a combined stream 270. Combined stream 270 contains transport layer packets (not shown) from media stream 210, where transport layer packets contain media packets 220. Combined stream 270 also contains POI packets 250 that refer to those media packets 220 within media stream 210 that are identified as points-of-interest. Point-of-interest consumer 160" examines combined stream 270, and uses the references within POI packets 250 to locate point-of-interest payloads in combined stream 270. In the example scenario of FIG. 2B, three media packets (220A-C) are identified as points-of-interest, and thus points-of-interest stream 240 contains three POI references packets 250A-C, each containing a reference 260A-C to a POI packet 230A-C. Once the points-of-interest are located, an intermediate processing function (not shown) uses the points-of-interest in a manner appropriate to its function. In yet another embodiment (not shown), the functionality of point-of-interest producer 150 is integrated with media source 120. In other words, media source 120 generates references to points-of-interest within the media stream as the media stream itself is generated.

Figure 2C:
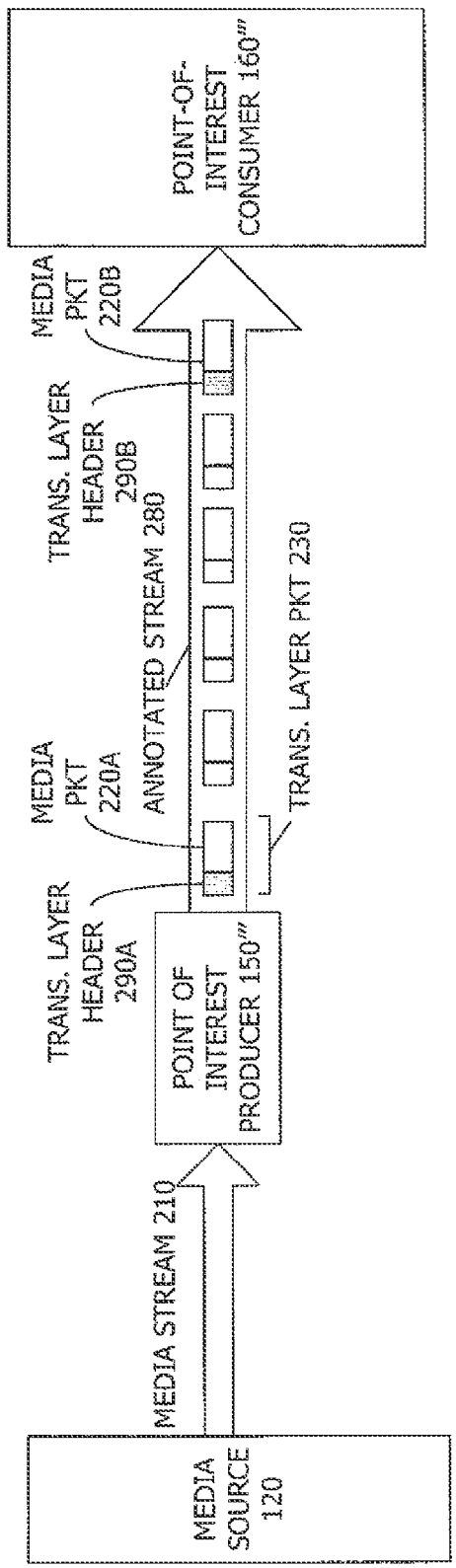
FIG. 2C is a block diagram of yet another embodiment in which a point-of-interest producer parses a media stream to locate points-of-interest, and produces a new stream, which is an annotated version of the original media stream.

FIG. 2C is a block diagram of another alternative embodiment in which point-of-interest producer 150'" parses media stream 210 to locate points-of-interest, and produces a new stream 280, which is an annotated version of original media stream 210. Annotated stream 280 contains transport layer packets 230 from media stream 210, where transport layer packets 230 contain media packets 220. Information carried in headers 290 on the transport layer packets 230 identifies whether or not the media packets 220 contained within are points-of-interest, and if so, provides further information about the point-of-interest. Point-of-interest consumer 160''' examines annotated stream 280, and uses the annotations within the transport layer headers 290 to determine which media payloads in annotated stream 280 are points-of-interest. In the example scenario of FIG. 2C, two media packets (220A, B) are identified as points-of-interest by information in their respective transport layer headers 290A, 290B.

In some embodiments, RTP is used as the transport layer protocol, and the point-of-interest information is conveyed in the RTP header using RTP header extensions. The RTP header extension is formed as a sequence of extension elements, with possible padding. Each extension element has a local identifier and a length. Further details on RTP header extensions can be found in Internet draft-ietf-avt-rtp-hdrext-12.txt ("A general mechanism for RTP Header Extensions"). Examples of local identifiers in this context include point-of-interest classifier, SMPTE time code information, or MPEG stream hints that can be used for decoder optimization, trick play state generation, etc.

The concept of a frame or PSI as being a "point-of-interest" should be familiar to a person of ordinary skill in the art, as will various mechanisms used to select "points of interest". Commonly used selection criteria include selecting the start of all I-frames, all PSIs, all ECMs, or various combinations of these criteria. In one embodiment, selection criteria involves selecting anchor frames. In this disclosure, an anchor frame is an I-frame, instantaneous decoder refresh frame (IDR-frame), or a frame that depends only on a past single reference frame that is the most-recently decoded anchor frame.

As described above in connection with FIGS. 2A-C, the same technique for identifying and encoding the POI information described herein can be used in many different ways: the POI information can be included in the steam as originated (e.g., included by the encoder); the media stream can be processed to produce a new stream of the same or a different protocol with POI annotations; or a separate POI annotation stream can be produced, leaving the original stream untouched. Having described in general the relationship between media stream 210 and the other streams (210, 220, 270, 280) the syntax and encoding of points-of-interest information will now be described in more detail in connection with the diagrams of FIGS. 3A-C.

Figure 3A:
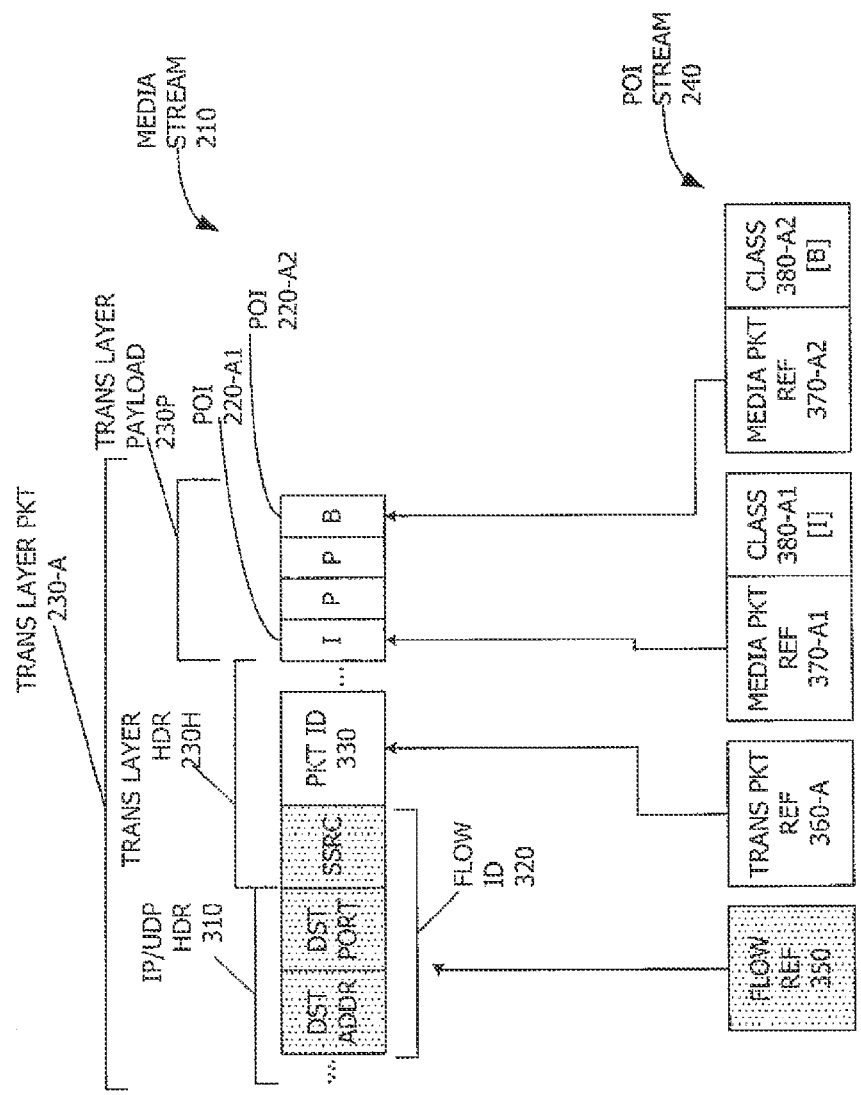
FIGS. 3A-C are block diagrams showing how syntax and encoding of points-of-interest information is performed in an embodiment of a system and method for utilizing locating points of interest.
Figure 3B:
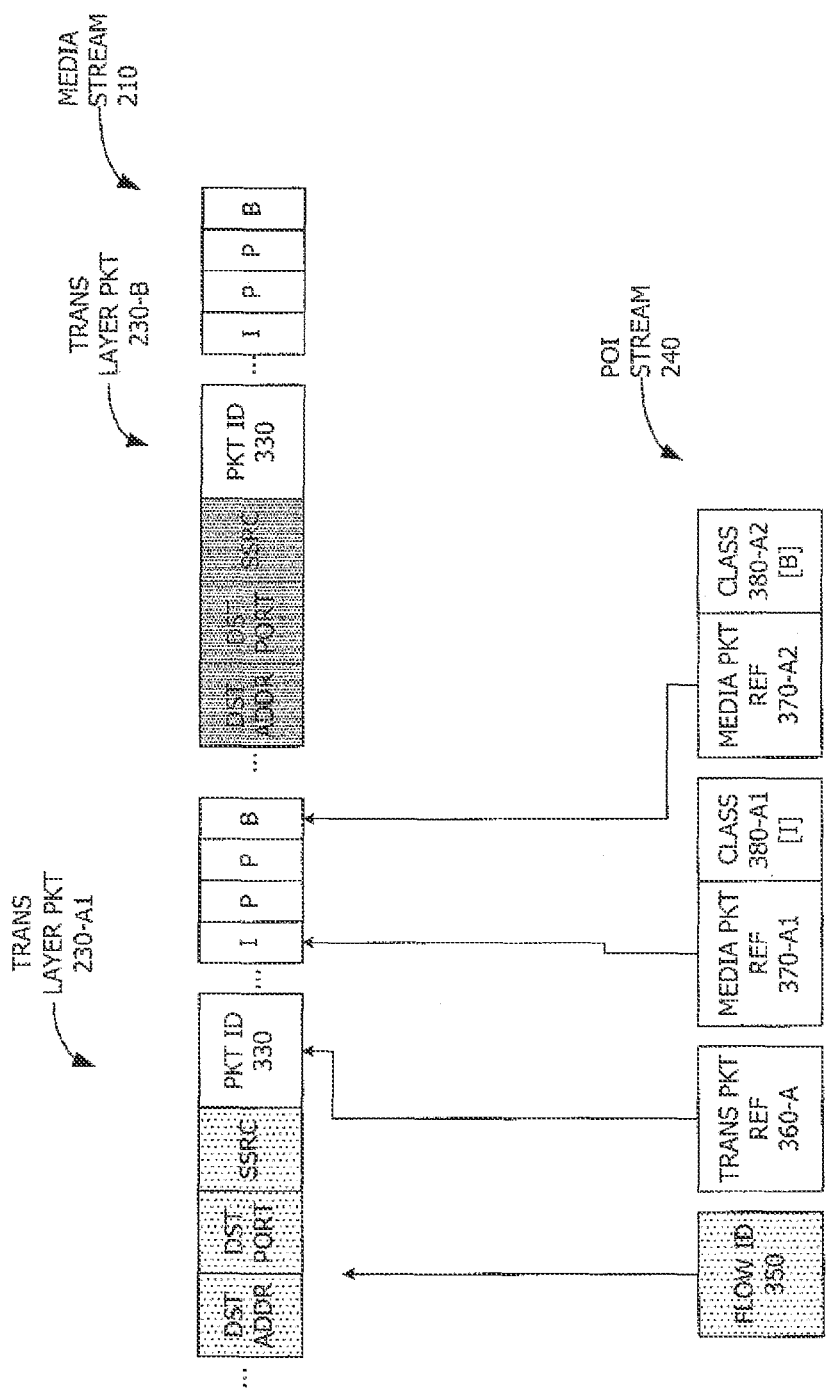
Figure 3C:
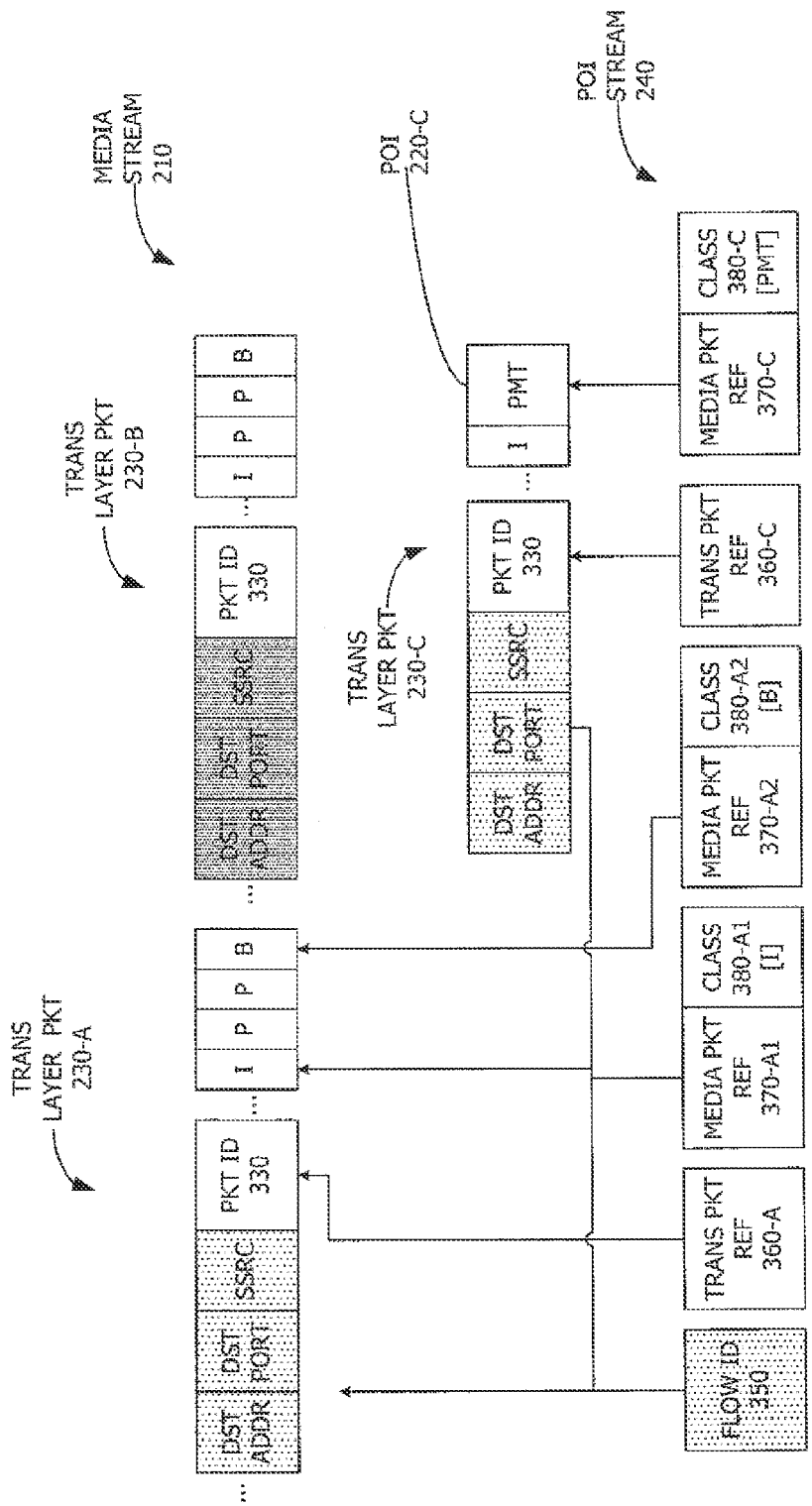

As can be seen in FIGS. 3A-C, media stream 210 is formatted as a stream of application-layer packets, referred to earlier as media packets 220. A media packet 220 encapsulates items such as a video frame, PSI, audio segments, etc. In some embodiments, these items can be split across media packets 220, so that one media packet 220 contains only a portion of a video frame, PSI, or audio segment.

Media packets 220 are encapsulated within transport layer packets 230, where each transport layer packet 230 includes a transport layer header 230H and a transport layer payload 230P. Transport layer packets 230 are in turn encapsulated by additional protocol layers, shown here as an additional header 310. In the embodiments described herein, Internet Protocol (IP) is used as the network layer and Real-time Transport Protocol (RTP) in combination with User Datagram Protocol (UDP) is used as the transport layer, with the media packets multiplexed into an MPEG2 Transport Stream. A person of ordinary skill in the art should be familiar with MPEG2 transport, IP, UDP and RTP packet formats, so headers and payloads have been simplified in FIGS. 3A-C.

As described earlier, point-of-interest producer 150 locates key frame media packets and program-specific information (PSI) media packets, and generates a reference to each of these points of interest. The first level reference to a particular media packet 220 identifies the containing transport layer packet 230. A particular transport layer packet 230 is identified by a flow identifier 320 and a flow-unique packet identifier 330. A person of ordinary skill in the art should be familiar with the concept of a packet flow, which consists of a series of packets between two endpoints, where the two endpoints are identified by information contained in each packet header. An RTP flow is defined by a destination address and a destination port (both part of IP/UDP header 310), and a synchronization source identifier (SSRC, part of transport layer header 230H). Thus, the combination of destination address, destination port, and SSRC serves as a flow identifier 320 for an RTP flow. In the case of RTP, the packet identifier 330 is a sequence number 330.

In the example scenario shown in FIG. 3A, point-of-interest producer 150 processes transport layer packet 230-A, and identifies two points of interest, namely, 220-A1 and 220-A2. References to these two points-of-interest are then added to points-of-interest stream 240 (shown in FIGS. 2A-C). Since both points of interest are located in the same transport layer packet (230-A), the first reference begins with a flow reference 350 and a transport packet reference 360, which together identify a particular transport layer packet (here, 230-A). In FIG. 3, flow reference 350 "points" to the flow identifier fields of transport layer packet 230-A, but a person of ordinary skill in the art should appreciate that this implies that flow reference 350 has the same values as the flow fields (destination address, destination port, SSRC) in transport layer packet 230-A. Similarly, transport packet reference 360-A "points" to the packet identifier field 330 of transport layer packet 230-A, which implies that transport packet reference 360-A is set to the same value as the packet identifier field 330.

Since a transport layer packet can carry multiple media packets, the reference to media packet 220-A1 continues with a media packet reference 370-A1. In FIG. 3A, media packet reference 370-A1 "points" to media packet 220-A1 as the first media packet within the transport layer packet 230. A person of ordinary skill in the art should appreciate that the symbolic representation used here (arrows between packet fields) can be implemented by setting media packet reference 370 to any value that specifies one packet in the sequence of media packets conveyed in transport layer packet 230. For example, media packet reference 370 can be a media packet number (e.g., first, second, etc.) or a byte offset (e.g., 0, 1.times.media packet size, etc.). In this example embodiment, the reference to media packet 220-A1 concludes with a point-of-interest classifier 380-A1 or type, further describing the point-of-interest. For example, a classifier 380 can describe a key frame, a particular type of key frame (e.g., I-frame), a PSI, or a particular type of PSI.

Point-of-interest producer 150 then adds a second reference to points-of-interest stream 240, the reference to point-of-interest 220-A2. Since this point-of-interest is contained in the same transport layer packet (230-A), it is unnecessary to repeat the flow reference (350) and the transport reference (360-A). The second point-of-interest (220-A2) is simply identified as the last media packet (370-A2) in transport layer packet 230-A.

FIG. 3B continues the example scenario. At this time, point-of-interest producer 150 processes a second transport layer packet 230-B, but finds no points of interest within transport layer packet 230-B. Therefore, no new references are added to points-of-interest stream 240.

FIG. 3C completes the example scenario. At this time, point-of-interest producer 150 processes a third transport layer packet 230-C, and finds one point-of-interest. Transport layer packet 230-C belongs to the same flow as the other two transport packets. Therefore, it is unnecessary to repeat the flow reference (350). The third point-of-interest (220-C) is identified by a new transport reference (360-C) and a new media packet reference (370-C).

The embodiment of FIGS. 3A-3C uses a combination of RTP and UDP as a transport layer. Another embodiment that uses UDP without RTP is now described in connection with FIG. 4. Media packets 220 are encapsulated within UDP packets 410, where each UDP packet 410 includes a UDP header 410H and a UDP payload 410P. UDP packet 410 is in turn encapsulated by additional protocol layers, shown here as an additional IP header 420. A particular UDP packet 410 belongs to a flow 430, identified by source IP address, destination IP address, protocol identifier (UDP), source UDP port, and destination UDP port.

Figure 4:
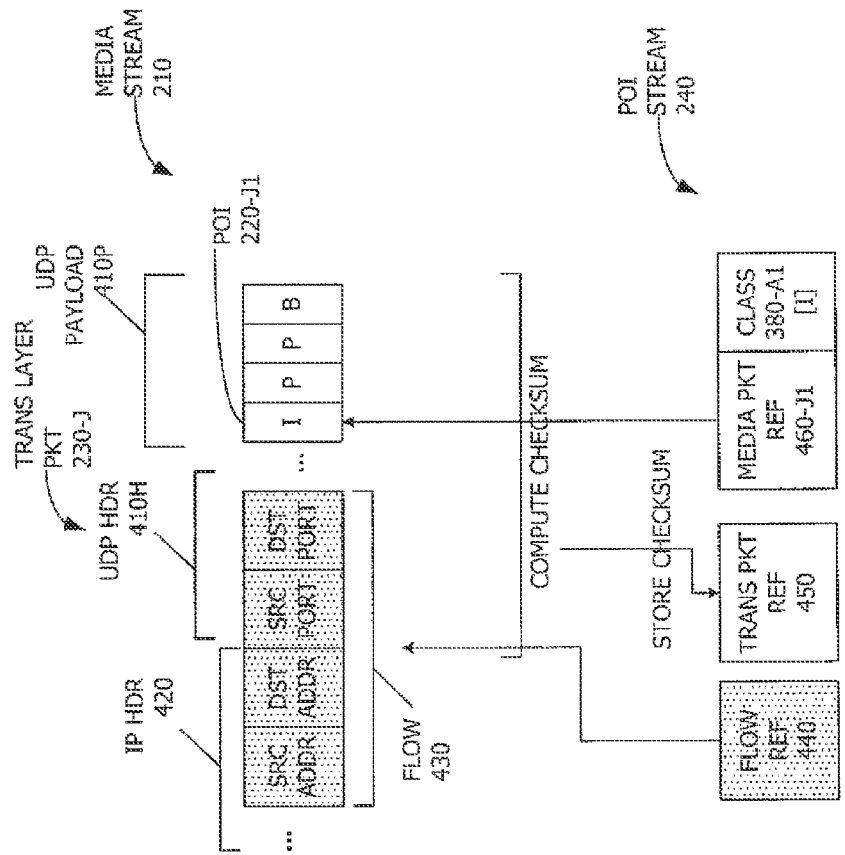
FIG. 4 is a block diagram showing how syntax and encoding of points-of-interest information is performed in another embodiment of a system and method for utilizing locating points of interest.

In the example scenario shown in FIG. 4, point-of-interest producer 150 processes transport layer packet 230-J, and identifies one point-of-interest, namely 220-J1. References to this point-of-interest are then added to points-of-interest stream 240. The first reference begins with a flow reference 440 that partially identifies transport layer packet 230-J. In FIG. 3, flow reference 350 "points" to the flow identifier fields of transport layer packet 230-J, but a person of ordinary skill in the art should appreciate that this implies that flow reference 350 has the same values as the flow fields (source and destination address, source and destination port) in transport layer packet 230-J.

The partial identification of transport layer packet 230-J is completed by transport packet reference 450. In the embodiment described above, RTP sequence numbers are used as transport packet references. However, UDP does not use sequence numbers, and there is nothing that is conveyed in the UDP packet itself which uniquely distinguishes one UDP packet from another. The embodiment of FIG. 4 uses an inventive technique whereby UDP packets are identified by a checksum. This checksum is computed by point-of-interest producer 150 and used as transport packet reference 450 within points-of-interest stream 240. Point-of-interest consumer 160 then computes a checksum on incoming packets, and uses this computed checksum as a transport packet identifier. In this manner, point-of-interest consumer 160 is able to distinguish among UDP packets belonging to the same flow, even though the packets themselves do not carry a unique identifier. In these embodiments, the checksum can be computed over any combination of the UDP header and UDP payload (which encapsulates an MPEG Transport Packet). In one example, the identifier is a checksum for UDP packet 410.

The embodiment of FIG. 4 uses a media packet reference 460 to specify a particular media packet 220 within transport layer packet 230-J. Media packet reference 460 is similar to the one described above for the UDP+RTP embodiment of FIGS. 3A-C, specifying either a packet number offset or a byte offset within the UDP payload 410P. This embodiment can also use a point-of-interest classifier 380 or type, further describing the point-of-interest (e.g., key frame, I-frame, B-frame, P-frame, PSI, PMT, PAT, ECM, etc.).

Figure 5:
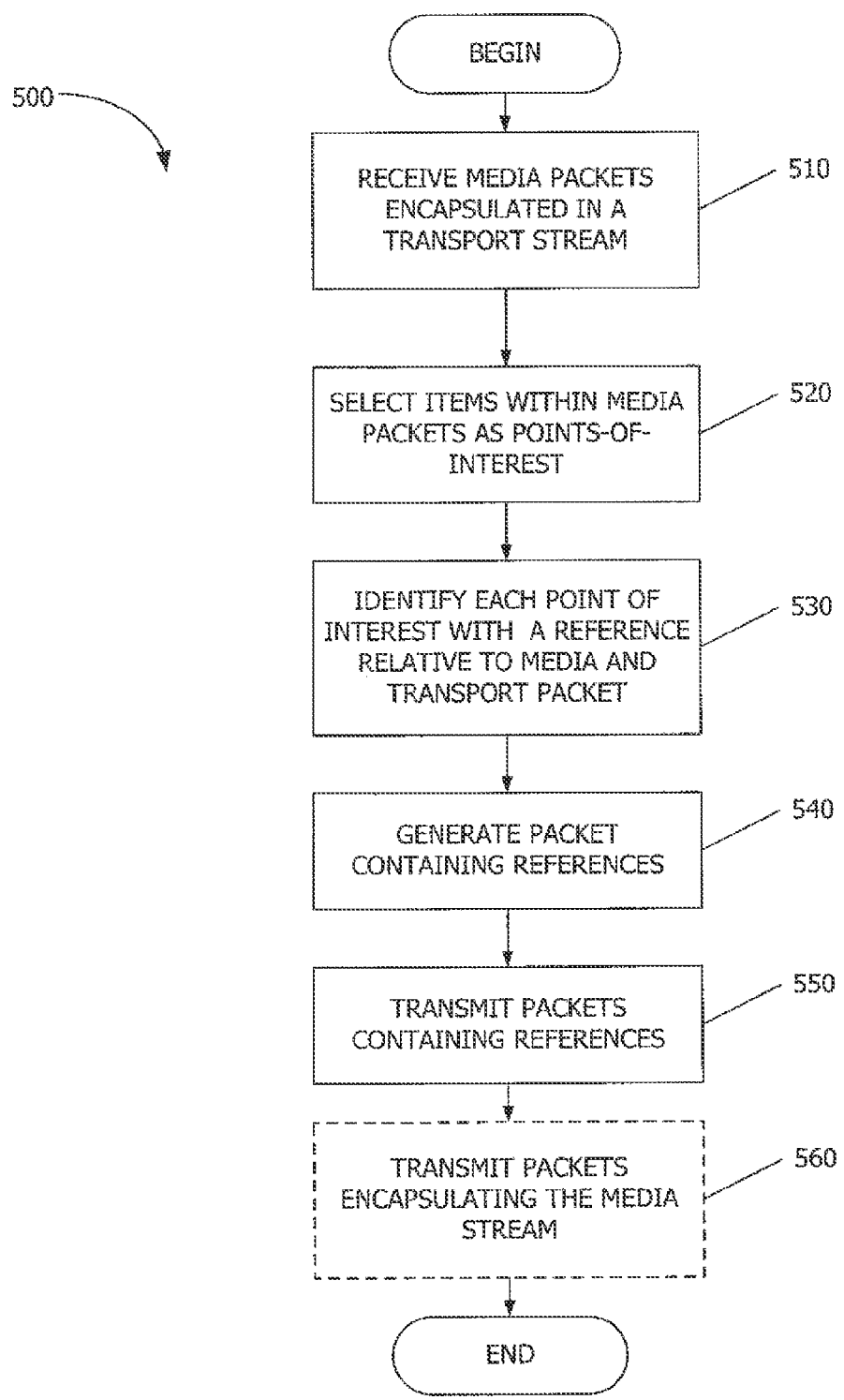
FIG. 5 is a flowchart of a process implemented by one embodiment of the point-of-interest producer from FIG. 1.

FIG. 5 is a flowchart of a process implemented by one embodiment of point-of-interest producer 150. The process 500 begins at block 510, where a stream of media packets encapsulated in a transport stream is received. Next, at block 520, the media packets are examined, and one or more frames or PSIs in the media packets are determined to be points of interest. The concept of a "point-of-interest" in a media stream should be known to a person of ordinary skill in the art, as should be various mechanisms for determining which frames or PSIs are points of interest. A few simple examples of selection criteria are selecting I-frames, selecting anchor frames (where anchor frames are described above), selecting PMTs, selecting PATs, and selecting ECMs, as well as combinations of these criteria.

Processing continues at block 530, where each point-of-interest is identified with a reference to a containing transport packet, and media packet within the transport packet. As described above, in one embodiment the reference is a combination that identifies the flow, the particular transport packet within the flow, and the particular media packet within the transport packet. In some embodiments, the reference also includes a description of the point-of-interest, such as frame or PSI, type of frame (I, B, P, etc.) and type of PSI (PMT, PAT, etc.).

Next, at block 540, a packet or series of packets that contain the references to points-of-interest are generated. As described above (in connection with FIG. 2C), some embodiments modify the transport layer headers of the original media packets to include point-of-interest information (such as a point-of-interest classifier), while other embodiments (described above in connection with FIG. 2B) generate reference packets or "point-of-interest" packets which are separate and distinct from media packets. A person of ordinary skill in the art should realize that when separate media and reference packets are used, the protocol used to carry the references is not required to be the same as the protocol that encapsulates the media packets (although the same protocol can be used). For example, one embodiment uses UDP to encapsulate MPEG-2 transport packets, but RTP to encapsulate the points-of-interest stream.

Processing continues at block 550, where the stream of packets containing the references to points-of-interest is transmitted to a receiver containing point-of-interest consumer 160 (FIG. 1). At block 560, which is optional, the packets containing the multimedia flow (received at block 510) are transmitted to the same receiver. These data flows may be in real time, or may be done in a non-real-time mode.

Figure 6:
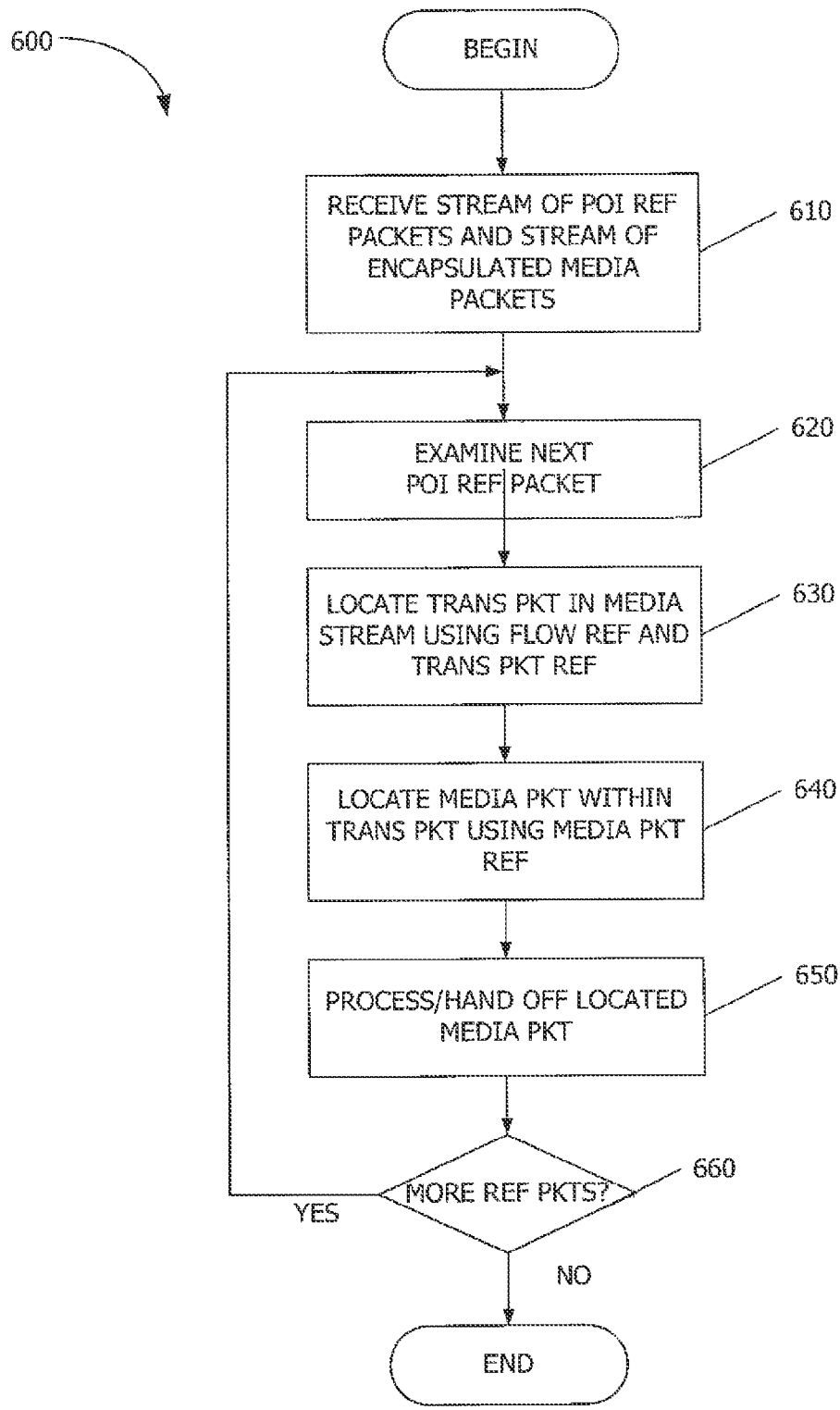
FIG. 6 is a flowchart of a process implemented by one embodiment of the point-of-interest consumer from FIG. 1.

FIG. 6 is a flowchart of a process implemented by one embodiment of point-of-interest consumer 160. The process 600 begins at block 610, where a stream of media packets encapsulated in a transport stream, and a stream of corresponding point-of-interest reference packets is received. At block 620, the next point-of-interest reference packet is examined. Block 630 uses the information within to locate the appropriate transport packet in the received media stream. In this example embodiment, the flow reference and transport packet reference fields within the reference packet are used to find a transport packet in the media stream having a matching flow identifier and sequence identifier.

Processing continues at block 640, where additional information within the current point-of-interest reference packet is used to locate the appropriate media packet within the already-identified (at block 630) transport packet. In this example embodiment, the media packet reference field within the reference packet is used to find the appropriate media packet within the series (e.g., the first, second, etc.).

Next, at block 650, the media packet found at block 640 is processed by some intermediate processing function, or is handed off by such an intermediate processing functions. The role of intermediate processing functions (such as trick mode stream generation in video-on-demand servers and locating key frames in fast channel change servers) is discussed above, and should be familiar to a person of ordinary skill in the art.

Block 660 determines whether any reference packets remain to be processed. If Yes, then processing starts for the next reference packet, at block 620. If No, process 600 is complete.

Figure 7A:
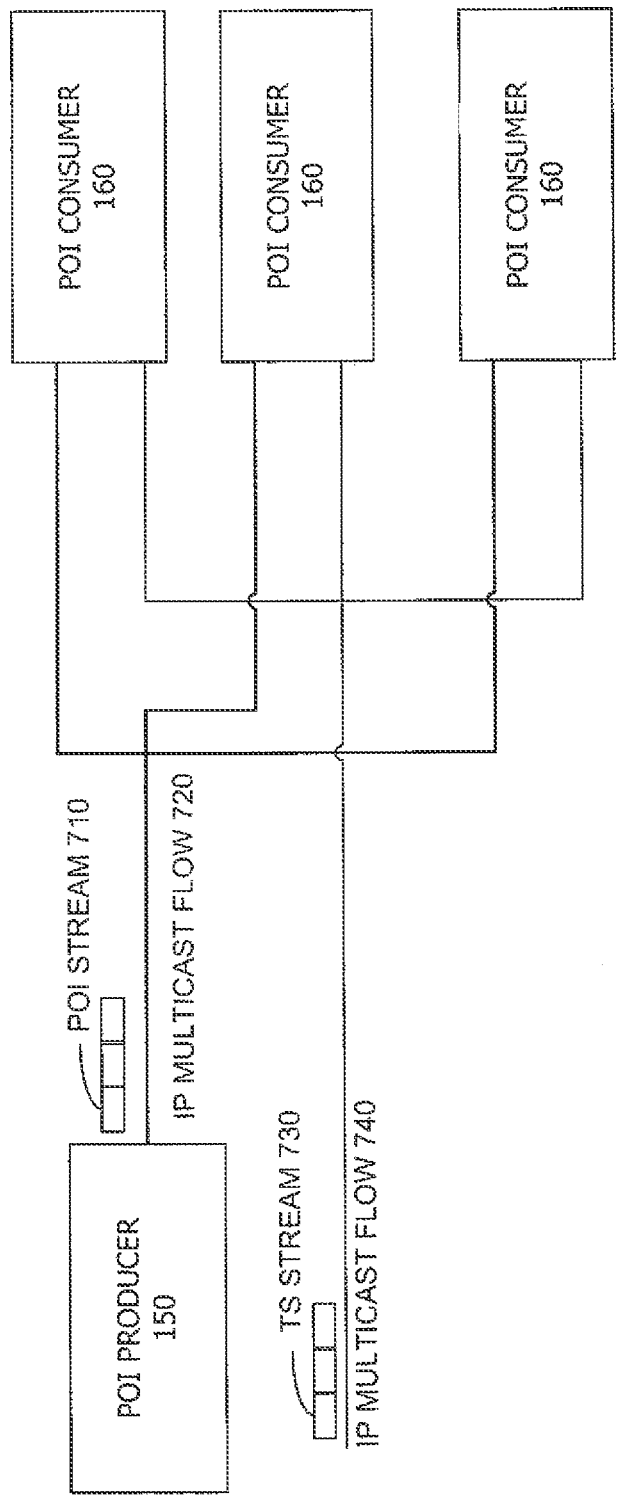
FIGS. 7A and 7B are blocks diagram of various embodiments of point-of-interest producer 150 and point-of-interest consumer 160.

FIG. 7A is a block diagram of an embodiment of point-of-interest producer 150 and point-of-interest consumer 160, in which IP multicast is used to deliver both the primary media stream and the points-of-interest stream. Point-of-interest producer 150 produces one points-of-interest stream 710, and transmits this points-of-interest stream 710 to several instances of point-of-interest consumer 160 using a IP multicast flow 720. As explained above, points-of-interest stream 710 is associated with (and generated from) a multimedia transport stream 730. In this example, transport stream 730 is transmitted on a separate IP multicast flow 740. This example also illustrates that transport stream 730 is transmitted by an entity other than point-of-interest producer 150. Other embodiments are contemplated in which point-of-interest producer 150 transmits both streams.

Figure 7B:
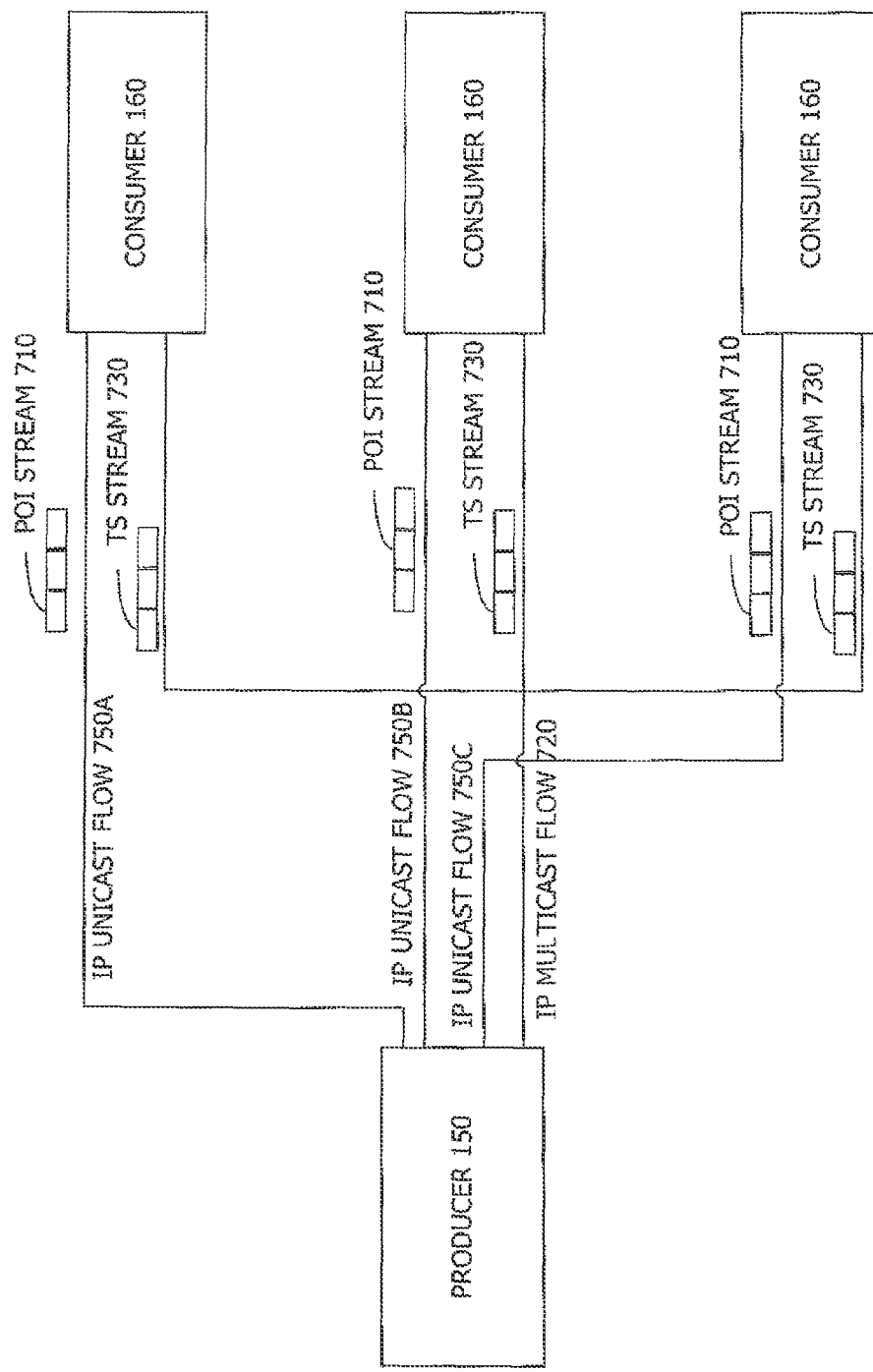

FIG. 7B is a block diagram of another embodiment of point-of-interest producer 150 and point-of-interest consumer 160, in which IP multicast is used to deliver the primary media stream and IP unicast is used to deliver the points-of-interest stream. Point-of-interest producer 150 produces one points-of-interest stream 710, and transmits this points-of-interest stream 710 to several instances of point-of-interest consumer 160, using a separate IP unicast flow 750A-C for delivery to each point-of-interest consumer 160. A single IP multicast flow 720 is used to transmit the multimedia transport stream 730 that is associated with the points-of-interest stream 710.

Several other flow variations (not shown) are contemplated. In one, each receiver receives the primary media stream and the points-of-interest stream on a single IP unicast address. The two streams are differentiated by UDP port number. In another variation, different IP multicast addresses are used to deliver points-of-interest stream 710 to different receivers. In yet another variation, the points-of-interest stream is delivered to multiple receivers using the same multicast IP address, but different UDP ports. In still another variation, the points-of-interest stream is delivered to different receivers on a single multicast IP address and a single UDP port, but distinguished by different PIDs.

Figure 8:
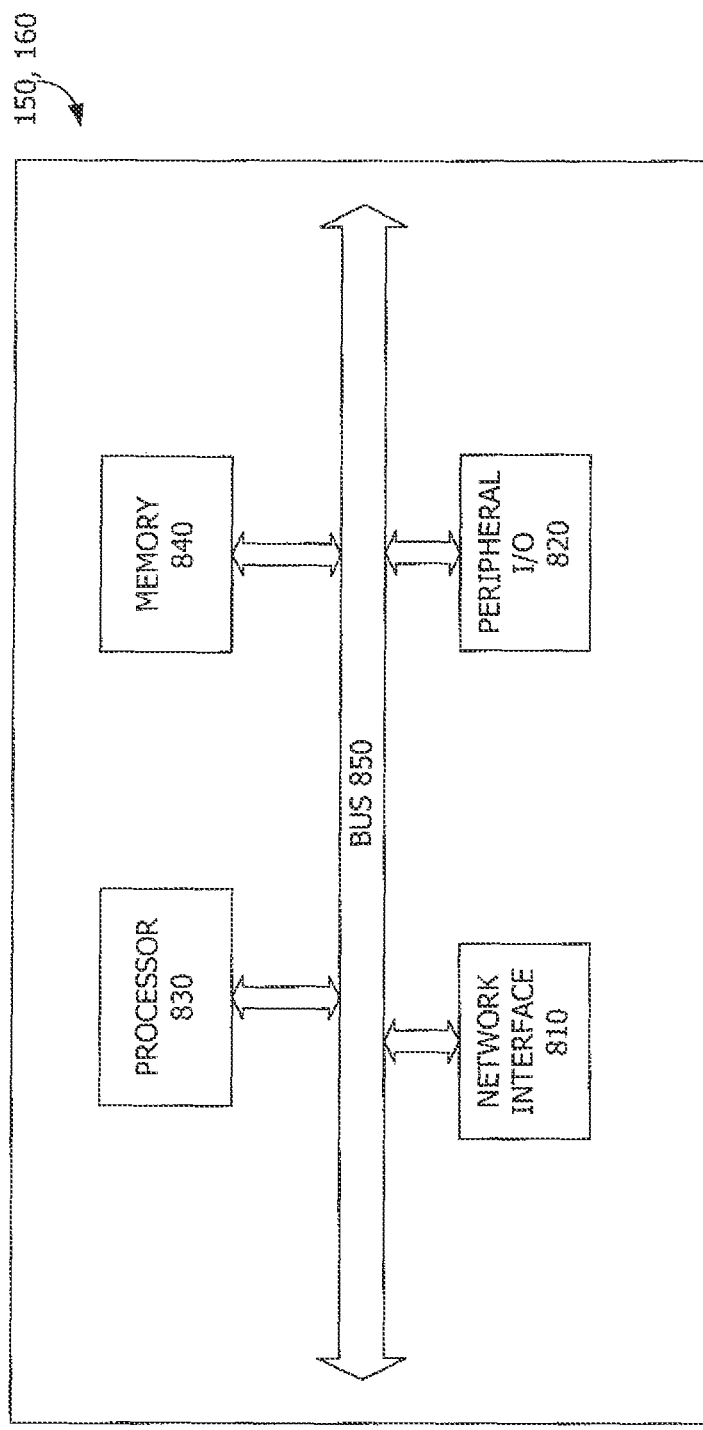
FIG. 8 is a block diagram showing selected components of a point-of-interest consumer or producer from FIG. 1.

FIG. 8 is a block diagram showing selected components of a point-of-interest consumer 160 or producer 150 which implements at least one of the systems and methods disclosed herein. Consumer 160 or producer 150 comprises: a network interface 810; a peripheral I/O interface 820; a processor 830; and memory 840. These components are coupled by a bus 850.

Memory 840 contains instructions that are executed by processor 830 to control operations of consumer 160 or producer 150. Peripheral I/O interface 820 provides input and output signals, for example, user inputs from a remote control or front panel buttons or a keyboard, and outputs such as LEDs or LCD on the front panel. Network interface 810 transmits/receives points-of-interest stream 240, media stream 210, and/or combined stream 270 (depending on the configuration). In some embodiments, network interface 810 is for a local area network (LAN) or a wide area network (WAN) such as the Internet. In other embodiments, this interface is for a radio frequency (RF) network, and so may include a tuner/demodulator (not shown) which processes the digital signals received over the RF network.

Omitted from FIG. 8 are a number of conventional components, known to those skilled in the art, that are unnecessary to explain the operation of the systems and methods disclosed herein. A person of ordinary skill in the art should understand that software components referred to herein includes executable code that is packaged, for example, as a standalone executable file, a library, a shared library, a loadable module, a driver, or an assembly, as well as interpreted code that is packaged, for example, as a class.

Any process descriptions or blocks in flowcharts should be understood as representing modules, segments, or portions of code which include one or more executable instructions for implementing specific logical functions or steps in the process. As would be understood by those of ordinary skill in the art of the software development, alternate implementations are also included within the scope of the disclosure. In these alternate implementations, functions may be executed out of order from that shown or discussed, including substantially concurrently or in reverse order, depending on the functionality involved.

The systems and methods disclosed herein can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any mechanism that can contain, store, communicate, propagate, or transport the program for use by, or in connection with, the instruction execution system. The computer readable medium can be, for example but not limited to, a system or propagation medium that is based on electronic, magnetic, optical, electromagnetic, infrared, or semiconductor technology.

Specific examples of a computer-readable medium using electronic technology may include (but are not limited to) the following: an electrical connection (electronic) having one or more wires; a random access memory (RAM); a read-only memory (ROM); an erasable programmable read-only memory (EPROM or Flash memory). A specific example using magnetic technology includes (but is not limited to) a portable computer diskette. Specific examples using optical technology include (but are not limited to) an optical fiber and a portable compact disk read-only memory (CD-ROM).

The foregoing description has been presented for purposes of illustration and description. It is not intended to be exhaustive or to limit the disclosure to the precise forms disclosed. Obvious modifications or variations are possible in light of the above teachings. The implementations discussed, however, were chosen and described to illustrate the principles of the disclosure and its practical application to thereby enable a person of ordinary skill in the art to utilize the disclosure in various implementations and with various modifications as are suited to the particular use contemplated. All such modifications and variation are within the scope of the disclosure as determined by the appended claims when interpreted in accordance with the breadth to which they are fairly and legally entitled.

We claim:

1. A method comprising:
receiving a transport packet stream encapsulating a first plurality of media packets;
generating, for a first media packet that is identified as a point-of-interest (POI) media packet, a first reference to the POI media packet relative to the location of the first media packet within the transport packet stream, wherein generating the first reference comprises:
generating a first flow identifier identifying a first transport packet of the transport packet stream that encapsulates the first media packet, wherein the first transport packet comprises a second plurality of media packets, and wherein the first flow identifier comprises a destination address, a destination port, and a synchronization source identifier (SSRC), and
generating a first transport packet reference comprising a first position reference in the first transport packet for the first media packet;
generating a second reference for a second media packet that is identified as the POI media packet;
adding the first reference to an auxiliary stream, the auxiliary stream being separate from the transport packet stream, the auxiliary stream comprising one or more references to one or more media packets in the transport packet stream identified as the POI media packet, wherein adding the first reference comprises adding the first flow identifier and the first transport packet reference to the auxiliary stream; and
adding the second reference to the auxiliary stream, wherein adding the second reference comprises adding, when the second media packet is located in the first transport packet, a second transport packet reference comprising a second position reference in the first transport packet for the second media packet.

2. The method of claim 1, further comprising identifying the one or more media packets as the point-of-interest media packet.

3. The method of claim 1, wherein receiving the transport packet stream comprises receiving the transport packet stream comprising a stream of UDP packets.

4. The method of claim 3, wherein generating the first reference comprises generating the reference comprising a first portion, a second portion, and a third portion.

5. The method of claim 4, wherein generating the first reference comprises setting the first portion of the reference to a UDP flow identifier of the UDP packet encapsulating the first media packet.

6. The method of claim 5, wherein generating the first reference comprises generating a checksum over the UDP packet encapsulating the first media packet.

7. The method of claim 6, wherein generating the first reference comprises setting the second portion of the first reference to the checksum.

8. The method of claim 7, wherein generating the first reference comprises setting the third portion of the first reference to a sequence number of the first media packet within the first transport packet.

9. A system comprising:
a memory storage; and
a processor coupled to the memory storage, wherein the processor is configured to:
receive a transport packet stream encapsulating a first plurality of media packets;
generate, for a first media packet that is identified as a point-of-interest (POI), a first reference to the first media packet relative to the location of the first media packet within the transport packet stream, wherein the processor being configured to generate the first reference comprises the processor being configured to:
generate a first flow identifier identifying a first transport packet of the transport packet stream that encapsulates the first media packet, wherein the first transport packet comprises a second plurality of media packets, and wherein the first flow identifier comprises a destination address, a destination port, and a synchronization source identifier (SSRC), and
generate a first transport packet reference comprising a first position reference in the first transport packet for the first media packet;
generate a second reference for a second media packet that is identified as the POI;
add the first reference to an auxiliary stream, the auxiliary stream being separate from the transport packet stream, the auxiliary stream comprising one or more references to one or more media packets in the transport packet stream identified as the POI, wherein the processor being configured to add the first reference comprises the processor being configured to add the first flow identifier and the first transport packet reference to the auxiliary stream; and
add the second reference to the auxiliary stream, wherein the processor being configured to add the second reference comprises the processor being configured to add, when the second media packet is located in the first transport packet, a second transport packet reference comprising a second position reference in the first transport packet for the second media packet.

10. The system of claim 9, wherein the processor is further configured with the logic to identify the one or more media packets as the point-of-interest.

11. The system of claim 9, wherein the processor configured with the logic to receive the transport packet stream comprises the processor configured with the logic to receive the transport packet stream comprising a stream of UDP packets.

12. The system of claim 11, wherein the processor configured with the logic to generate the reference comprises the processor configured with the logic to generate the reference comprising a first portion, a second portion, and a third portion.

13. The system of claim 12, wherein the processor configured with the logic to generate the reference comprises the processor configured with the logic to set the first portion of the reference to a UDP flow identifier of the UDP packet encapsulating the POI media packet.

14. The system of claim 13, wherein the processor configured with the logic to generate the reference comprises the processor configured with the logic to generate a checksum over the UDP packet encapsulating the POI media packet.

15. The system of claim 14, wherein the processor configured with the logic to generate the reference comprises the processor configured with the logic to set the second portion of the reference to the checksum.

16. The system of claim 15, wherein the processor configured with the logic to generate the reference comprises the processor configured with the logic to set the third portion of the reference to a sequence number of the POI media packet within the encapsulating one of the transport packets.

17. A non-transitory computer-readable medium which stores a set of instructions which when executed performs a method, the method executed by the set of instructions comprising:
receiving a transport packet stream encapsulating a first plurality of media packets;
generating, for a first media packet that is identified as a point-of-interest (POI), a first reference to the first media packet relative to the location of the first media packet within the transport packet stream, wherein generating the first reference comprises:
generating a first flow identifier identifying a first transport packet of the transport packet stream that encapsulates the first media packet, wherein the first transport packet comprises a second plurality of media packets, and wherein the first flow identifier comprises a destination address, a destination port, and a synchronization source identifier (SSRC), and
generating a first transport packet reference comprising a first position reference in the first transport packet for the first media packet; and
generating a second reference for a second media packet that is identified as a POI media packet;
adding the first reference to an auxiliary stream, the auxiliary stream being separate from the transport packet stream, the auxiliary stream comprising one or more references to one or more media packets in the stream identified as the POI, wherein adding the first reference comprises adding the first flow identifier and the first transport packet reference into the auxiliary stream; and
adding the second reference to the auxiliary stream, wherein adding the second reference comprises adding, when the second media packet is located in the first transport packet, a second transport packet reference comprising a second position reference in the first transport packet for the second media packet.

18. The non-transitory computer-readable medium of claim 17, wherein receiving the transport packet stream comprises receiving the transport packet stream comprising a stream of UDP packets.

19. The non-transitory computer-readable medium of claim 18, wherein generating the reference comprises generating the reference comprising a first portion, a second portion, and a third portion.

20. The non-transitory computer-readable medium of claim 19, further comprising:
setting the first portion of the reference to a UDP flow identifier of the UDP packet encapsulating the POI media packet;
generating a checksum over the UDP packet encapsulating the POI media packet;
setting the second portion of the reference to the checksum; and
setting the third portion of the reference to a sequence number of the POI media packet within the encapsulating one of the transport packets.

* * * * *